(12) United States Patent
Stoltze et al.

(10) Patent No.: US 10,458,485 B2
(45) Date of Patent: Oct. 29, 2019

(54) SELF-SYNCHRONIZING CLUTCH

(71) Applicant: Warner Electric Technology LLC, Braintree, MA (US)

(72) Inventors: David Pearson Stoltze, Brighton, MI (US); Erik Raymond Christiansen, Georgetown, MA (US)

(73) Assignee: Warner Electric Technology LLC, Braintree, MA (US)

( * ) Notice: Subject to any disclaimer, the term of this patent is extended or adjusted under 35 U.S.C. 154(b) by 100 days.

(21) Appl. No.: 15/810,806

(22) Filed: Nov. 13, 2017

(65) Prior Publication Data

US 2018/0135706 A1  May 17, 2018

Related U.S. Application Data (60) Provisional application No. 62/423,230, filed on Nov. 17, 2016.

(51) Int. Cl.
| | |
|---|---|
| *F16D 23/10* | (2006.01) |
| *F16D 11/06* | (2006.01) |

(Continued)

(52) U.S. Cl.
CPC .............. *F16D 23/10* (2013.01); *F16D 11/06* (2013.01); *F16D 41/064* (2013.01);
(Continued)

(58) Field of Classification Search
CPC .... F16D 23/10; F16D 43/2028; F16D 41/064; F16D 41/088; F16D 11/06; F16D 41/16;
(Continued)

(56) References Cited

U.S. PATENT DOCUMENTS

| | | | |
|---|---|---|---|
| 2,232,090 | A | 2/1941 | Anderson |
| 2,907,431 | A | 10/1959 | Sinclair |

(Continued)

FOREIGN PATENT DOCUMENTS

| | | |
|---|---|---|
| DE | 2740638 A1 | 3/1978 |
| EP | 0013913 A1 | 8/1980 |
| EP | 0580988 A1 | 2/1994 |

OTHER PUBLICATIONS

"Bibby Transmissions Group Product Range," Bibby Transmissions Ltd., cover and p. 66.

(Continued)

*Primary Examiner* — Huan Le
(74) *Attorney, Agent, or Firm* — Reising Ethington P.C.

(57) ABSTRACT

A clutch includes inner and outer races, each with pluralities of teeth. A pawl is supported on the inner race and a shift ring disposed outward of the pawl defines pawl engagement surfaces on an inner perimeter. Pins engage cam surfaces formed in the ring and outer race. When the inner race rotates faster than the outer race, the pawl engages the ring causing relative movement between the ring and outer race that moves the pins radially inward along the cam surfaces to locate the pins between corresponding teeth on the races and rotatably couple the races. When the outer race rotates faster than the inner race, the ring moves relative to the outer race and the pins move radially outward along the cam surfaces away from the corresponding teeth to uncouple the races, disengage the ring from the pawl and allow the outer race to overrun the inner race.

8 Claims, 4 Drawing Sheets

(51) Int. Cl.
    *F16D 43/202* (2006.01)
    *F16D 41/064* (2006.01)
    *F16D 41/08* (2006.01)
    *F16D 41/16* (2006.01)
    *F16D 23/12* (2006.01)

(52) U.S. Cl.
    CPC ......... *F16D 41/084* (2013.01); *F16D 41/088* (2013.01); *F16D 41/16* (2013.01); *F16D 43/2028* (2013.01); *F16D 2023/123* (2013.01); *F16D 2041/0646* (2013.01)

(58) Field of Classification Search
    CPC ............. F16D 41/084; F16D 2023/123; F16D 2041/0646
    See application file for complete search history.

(56) References Cited

U.S. PATENT DOCUMENTS

| | | |
|---|---|---|
| 2,986,949 A | 6/1961 | Lancaster et al. |
| 3,025,987 A | 5/1962 | Clements et al. |
| 3,851,740 A | 12/1974 | Heybourne |

OTHER PUBLICATIONS

"SSS Clutch Operating Principle," SSS Gears Limited Pub. No. 100, Revision 2.
"Turbine Starting System Improvement," Nuovo Pignone S.p.A. (2002).
International Search Report issued in International (PCT) Application No. PCT/US2017/061309 (dated Mar. 8, 2018).
Written Opinion issued in International (PCT) Application No. PCT/US2017/061309 (dated Mar. 8, 2018).

SELF-SYNCHRONIZING CLUTCH

BACKGROUND OF THE INVENTION a. Field of the Invention

This disclosure relates to a clutch. In particular, the instant disclosure relates to a self-synchronizing clutch that is capable of synchronizing the input and output members of the clutch without axial displacement of either member along the rotational axis of the clutch.

b. Background Art

Self-synchronizing clutches are useful in a variety of applications. In one exemplary application, a self-synchronizing clutch may be used to transfer power from a starter to a turbine. Turbines are commonly used to generate electrical power in industrial and manufacturing facilities and on large vessels. A starter is typically used to initiate rotation of the rotary components of the turbine and to bring those components to a self-sustaining speed. Because turbines take a relatively long time to bring to a complete rest, it is desirable to be able to engage the clutch to provide power from the motor to the turbine or to restart the turbine even when the turbine is in motion. As a result, the clutch must be capable of synchronizing its input and output members to avoid undesirable noise and wear on the clutch members during engagement and to insure complete engagement for efficient torque transfer.

In another exemplary application, a self-synchronizing clutch may be used to transfer power between a motor, turbine or other power source and a generator for use as a synchronous condenser. Synchronous condensers are used to adjust voltage on an electric power transmission grid by absorbing or generating power. In synchronous condensing, the clutch is initially engaged to transfer power from the turbine or other power source to the generator in order to bring the speed of the generator up to the speed necessary to synchronize the generator with the transmission grid. At that point, the clutch disengages to decouple the generator from the power source and the generator acts as a motor driven by power from the grid. If the rotational speed of the generator decreases below the rotational speed of the power source, the clutch reengages.

Conventional self-synchronizing clutches require movement of one of the input or output members along the rotational axis of the clutch in order to engage and disengage the clutch. As a result, the clutch must be configured for controlled movement along multiple degrees of freedom. The clutch also requires additional space in the direction of the rotational axis making it difficult to install the clutch in preexisting systems (e.g., when a synchronous generator is converted for use as a synchronous condenser).

The inventor herein has recognized a need for a clutch that will minimize and/or eliminate one or more of the above-identified deficiencies.

BRIEF SUMMARY OF THE INVENTION

A clutch is provided. In particular, a self-synchronizing clutch is provided that is capable of synchronizing the input and output members of the clutch without axial displacement of either member along the rotational axis of the clutch.

A clutch in accordance with one embodiment of the invention includes an inner race configured for rotation about a first rotational axis and defining a first plurality of teeth. The clutch further includes an outer race disposed radially outwardly of the inner race and defining a second plurality of teeth and a first plurality of cam surfaces. The clutch further includes a pawl supported on a first axial side of the inner race and configured for rotation about a second rotational axis parallel to the first rotational axis. The clutch further includes a shift ring disposed radially outwardly of the pawl and configured for rotation relative to the outer race. The shift ring defines a plurality of pawl engagement surfaces on a radially inner perimeter and defines a second plurality of cam surfaces. The clutch further includes a plurality of pins. Each of the plurality of pins is configured for engagement with corresponding ones of the first and second pluralities of cam surfaces. Rotation of the inner race in a first direction about the first rotational axis at a rotational speed greater than a rotational speed of the outer race causes the pawl to engage one of the plurality of pawl engagement surfaces in the shift ring thereby causing relative movement between the shift ring and the outer race and moving the plurality of pins in a radially inward direction along the first and second pluralities of cam surfaces to locate the pins between corresponding teeth from the first and second pluralities of teeth and couple the inner race and the outer race for rotation. Rotation of the outer race in the first direction at a rotational speed greater than the rotational speed of the inner race causes relative movement between the shift ring and the outer race thereby moving the plurality of pins in a radially outward direction along the first and second pluralities of cam surfaces and away from the corresponding teeth to uncouple the inner race and the outer race and disengage the shift ring from the pawl and allow the outer race to overrun the inner race.

A clutch in accordance with another embodiment of the invention includes a first inner race configured for rotation about a first rotational axis and defining a first plurality of teeth and a first outer race disposed radially outwardly of the first inner race and defining a second plurality of teeth and a first plurality of cam surfaces. The clutch further includes a second inner race coupled to the first inner race for rotation therewith and configured for rotation about the first rotational axis. The second inner race defines a third plurality of teeth. The clutch further includes a second outer race disposed radially outwardly of the second inner race and defining a fourth plurality of teeth and a second plurality of cam surfaces. The clutch further includes a pawl disposed between the first and second inner races and supported on the first inner race. The pawl is configured for rotation about a second rotational axis parallel to the first rotational axis. The clutch further includes a shift ring disposed radially outwardly of the pawl and configured for rotation relative to the first and second outer races. The shift ring defines a plurality of pawl engagement surfaces on a radially inner perimeter and defines a third plurality of cam surfaces. The clutch further includes a plurality of pins. Each of the plurality of pins is configured for engagement with corresponding ones of the first, second and third pluralities of cam surfaces. Rotation of the first and second inner races in a first direction about the first rotational axis at a rotational speed greater than a rotational speed of the first and second outer races causes the pawl to engage one of the plurality of pawl engagement surfaces in the shift ring thereby causing relative movement between the shift ring and the first and second outer races and moving the plurality of pins in a radially inward direction along the first, second, and third pluralities of cam surfaces to locate the pins between corresponding teeth from the first and second pluralities of teeth and between corresponding teeth from the third and fourth pluralities of teeth to couple the first and second inner races and the first and second outer races for rotation. Rotation of the first and second outer races in the first direction at a rotational speed greater than the rotational speed of the first and second inner races causes relative movement between the shift ring and the first and second outer races thereby moving the plurality of pins in a radially outward direction along the first, second, and third pluralities of cam surfaces and away from the corresponding teeth to uncouple the first and second inner races and the first and second outer races, disengage the shift ring from the first pawl and allow the first and second outer races to overrun the first and second inner races.

A clutch in accordance with the present teachings is advantageous relative to conventional clutches because it is capable of synchronizing rotation of the input and output members of the clutch without displacement of either member along the rotational axis of the clutch. As a result, the clutch does not have to be configured for movement along the rotational axis nor designed to control such movement. Further, the clutch requires less space in the direction of the rotational axis and is easier to retrofit into preexisting systems (e.g., when a synchronous generator is converted for use as a synchronous condenser).

The foregoing and other aspects, features, details, utilities, and advantages of the invention will be apparent from reading the following detailed description and claims, and from reviewing the accompanying drawings illustrating features of this invention by way of example.

DETAILED DESCRIPTION OF THE INVENTION

Figure 1:
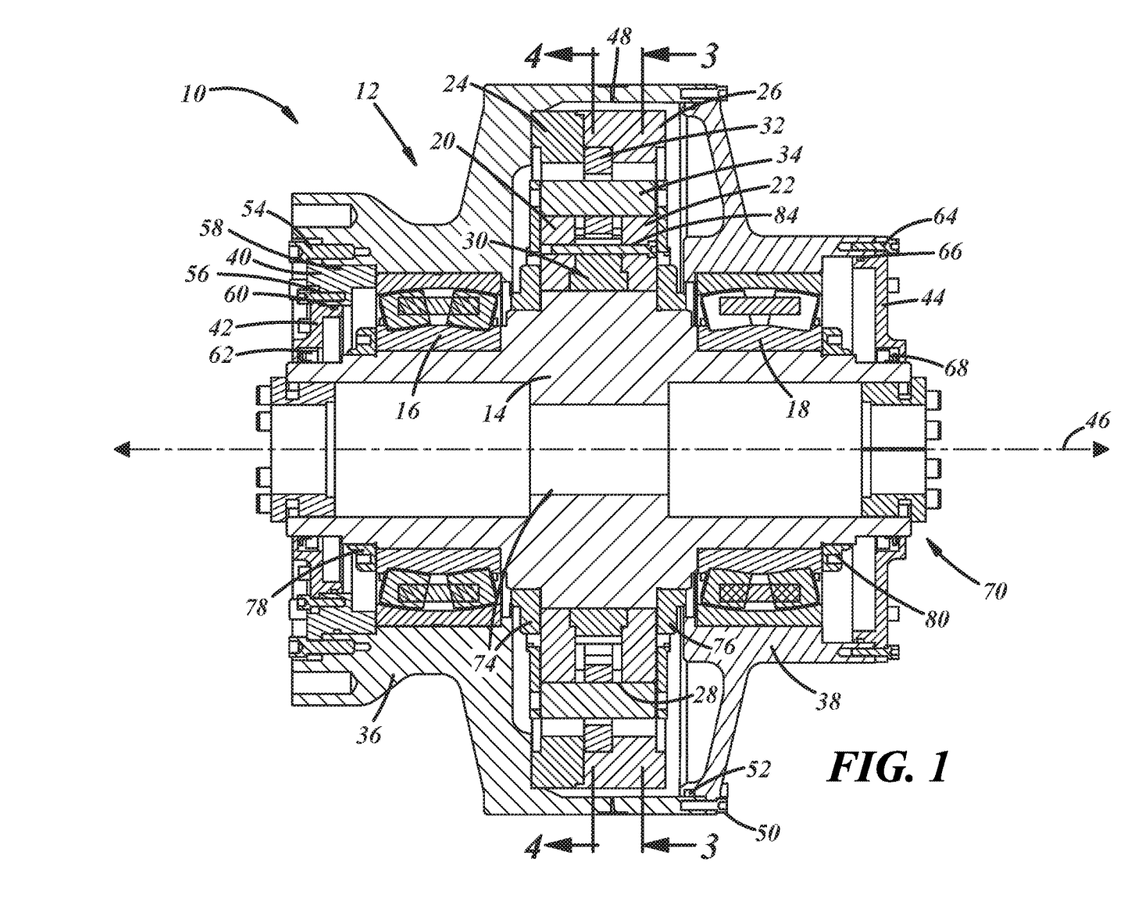
FIG. 1 is a cross-sectional view of a clutch in accordance with one embodiment of the present invention.
Figure 2:
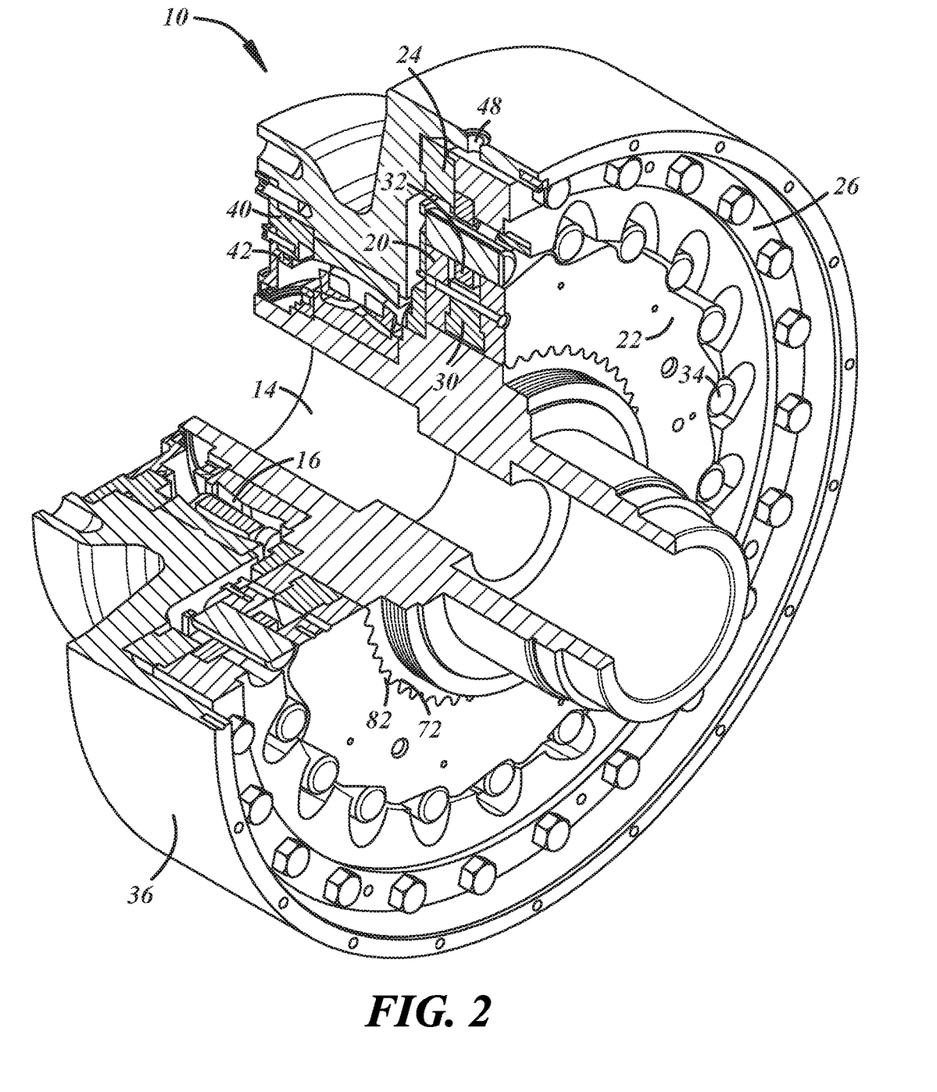
FIG. 2 is a perspective and cross-sectional view of a portion of the clutch of FIG. 1.

Referring now to the drawings wherein like reference numerals are used to identify identical components in the various views, FIGS. 1-2 illustrate a clutch 10 in accordance with one embodiment of the invention. Clutch 10 provides a mechanism for selectively transferring torque from an input or driving member to an output or driven member and for allowing the output to overrun the input. In one embodiment, clutch 10 may be used to transmit torque from a starting motor to a turbine. In another embodiment, clutch 10 may be used to transmit torque from a turbine to a generator used as a synchronous condenser. It should be understood, however, that clutch 10 may find use in a variety of applications. Clutch 10 may include a housing 12, a hub 14, bearings 16, 18, inner races 20, 22, outer races 24, 26, pawls 28, a pawl landing ring 30, a shift ring 32, and pins 34.

Housing 12 is provided to protect the components of clutch 10 from foreign objects and elements and to position and orient the components of clutch 10. Housing 12 is also provided to transmit torque to a driven member or output during engagement of clutch 10. Housing 12 may include multiple members 36, 38, 40, 42, 44. Members 36, 38, 40, 42, 44 may be made from conventional metals and metal alloys. Each of members 36, 38, 40, 42, 44 is annular in shape and configured to be disposed about a rotational axis 46 of clutch 10. Member 36 extends from one axial end of clutch 10 and is supported on an outer race of bearing 16. Member 36 is configured for connection to an output such as a rotational element of a turbine or of a generator used as a synchronous condenser. A portion of member 36 may be disposed radially outwardly of outer races 24, 26 and may define one or more openings 48 through which lubricants may be delivered to the internal components of clutch 10. Member 38 extends from the opposite axial end of clutch 10 towards member 36 and is supported on an outer race of bearing 18. Member 38 may be joined to member 36 using conventional fasteners 50 such as screws or bolts and a seal 52 may be disposed radially between portions of members 36, 38 to prevent entry of foreign elements and loss of lubricants. Members 40, 42 form an end cap at one axial end of clutch 10 to close the space between hub 14 and member 36 of housing 12 in which bearing 16 is located. Member 40 may be coupled to member 36 and to member 42 using conventional fasteners 54, 56, respectively, such as screws or bolts. Seals 58, 60, 62 may be disposed radially between member 36 and member 40, between member 40 and member 42 and between member 42 and hub 14 to prevent entry of foreign elements and loss of lubricants. Member 44 forms an end cap at the opposite axial end of clutch 10 to close the space between hub 14 and member 38 of housing 12 in which bearing 18 is located. Member 44 may be coupled to member 38 using conventional fasteners 64 such as screws or bolts and a seals 66, 68 may be disposed radially between member 38 and member 44 and between member 44 and hub 14 to prevent entry of foreign elements and loss of lubricants. Although a particular configuration for housing 12 has been illustrated herein, it should be understood that the configuration of housing 12 may change depending on the configuration of components within housing 12 and the system in which clutch 10 is employed.

Hub 14 is provided to transfer torque between a driving member or input such as a starter motor or an element of a turbine in a synchronous condenser to input races 20, 22 of clutch 10. Hub 14 is annular in shape and is disposed about, and may be centered about, axis 46. Hub 14 is configured to receive a shaft or similar element of the input at one axial end 70 of hub 14. Hub 14 is symmetrical in the illustrated embodiment and has an outer diameter that increases in steps moving from either axial end to the axial center of hub 14. At the axial center of hub 14, hub 14 has a diameter configured to engage and support inner races 20, 22 and pawl landing ring 30. Referring to FIG. 2, this portion of hub 14 may include a plurality of splines 72 on a radially outer surface configured to engage corresponding splines formed in the radially inner surfaces of races 20, 22 and ring 30 in order to couple the races 20, 22 and ring 30 to hub 14 for rotation therewith. On either side of this portion of hub 14, the diameter of hub 14 may be reduced to define a shoulders supporting locking rings 74, 76 that maintain races 20, 22 and ring 30 in place on hub 14. Moving outward toward each axial end, the outer diameter of hub 14 may be further reduced to define surfaces configured to support the inner races of bearings 16, 18, reduced again to define surfaces configured to support locking rings 78, 80 that maintain the position of bearings 16, 18 on hub 14. and reduced yet again to support members 42, 44 of housing 12.

Bearings 16, 18 are provided to allow housing 12 to rotate relative to hub 14 when clutch 10 is an overrunning state. Bearings 16, 18 may comprise spherical roller bearings. Although bearings 16, 18 both comprise spherical roller bearings in the illustrated embodiment, it should be understood that one or both of bearings 16, 18 may assume other forms including, for example, ball bearings. Bearing 16 is disposed between hub 14 and member 36 of housing 12 on one axial side of races 20, 22, 24, 26. Bearing 18 is disposed between hub 14 and member 38 of housing 12 on the opposite axial side of races 20, 22, 24, 26.

Figure 3A:
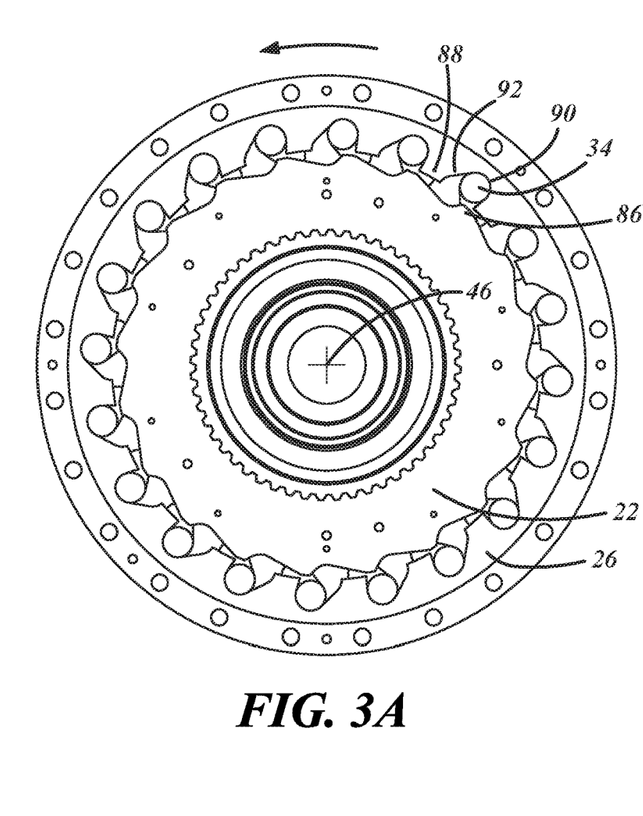
FIGS. 3A-3B are cross-sectional views of the clutch of FIGS. 1-2 taken along lines 3-3 in FIG. 1 showing the clutch disengaged and engaged.
Figure 3B:
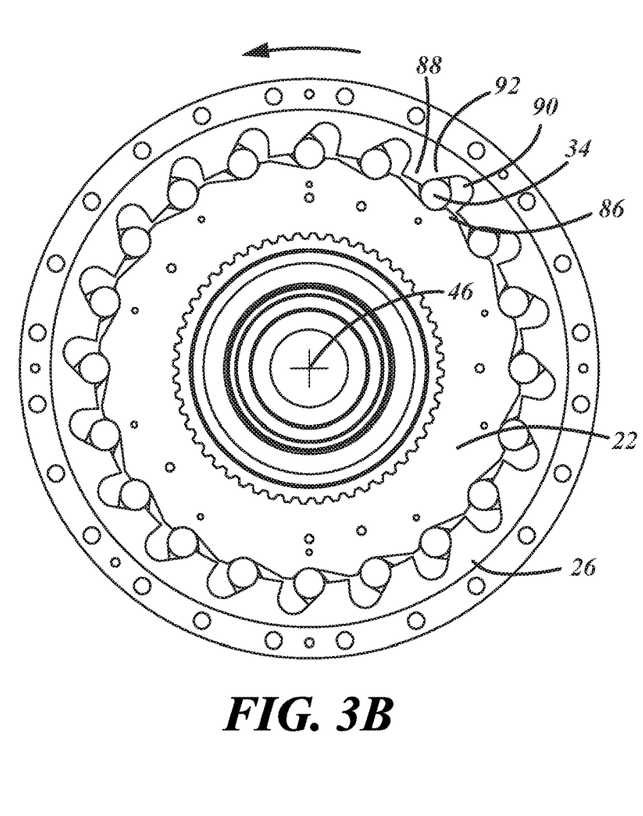

Inner races 20, 22 provide an engagement surface for pins 34 during engagement of clutch 10. Inner races 20, 22 are annular in shape and disposed about, and may be centered about, axis 46. Referring to FIG. 2, inner races 20, 22 are supported on hub 14 and a radially inner surface of each race 20, 22 may define a plurality of splines 82 configured to mesh with splines 72 in hub 14. Referring again to FIG. 1, races 20, 22 are axially spaced from one another and configured to receive pawl landing ring 30 therebetween. Races 20, 22 may be coupled together by fasteners 84 such as screws, bolts or pins extending through races 20, 22 and paw landing ring 30. Referring to FIGS. 3A-B, the radially outer surface of each inner race 20, 22 defines a plurality of teeth 86. Each tooth 86 is configured to engage a corresponding pin 34 during engagement of clutch 10.

Referring again to FIGS. 1-2, outer races 24, 26 provide opposing engagement surfaces for pins 34 during engagement of clutch 10. Outer races 24, 26 are annular in shape and disposed about, and may be centered about, axis 46. Outer races 24, 26 are disposed radially outwardly of inner races 20, 22, respectively. In the illustrated embodiment, outer race 26 has a greater axial length than race 24 and a portion of race 26 may be disposed radially outwardly of shift ring 32. Outer races 24, 26 may be coupled together using conventional fasteners (not shown) such as screws, bolts or pins. Referring again to FIGS. 3A-B, the radially inner surface of each outer race 24, 26 defines a plurality of teeth 88. Referring to FIG. 3B, each tooth 88 is configured to engage a corresponding pin 34 and to trap the pin 34 between corresponding teeth 86, 88 on races 22, 26 (and 20, 24) during engagement of clutch 10. Referring to FIG. 3A, each race 24, 26 further defines a recess 90 or pocket configured to receive a corresponding pin 34 during disengagement of clutch 10. Between each tooth 88 and recess 90, races 24, 26 define cam surfaces 92 that extend from each tooth 88 to a corresponding recess 90. Each cam surface 92 extends along a plane that is skewed relative to axis 46 with the radially innermost portion of the surface 92 further forward in the direction of rotation than a radially outermost portion of the surface 92. As clutch 10 transitions between an engaged state and a disengaged state, pins 34 ride along cam surfaces 92 between teeth 88 and recesses 90.

Figure 4A:
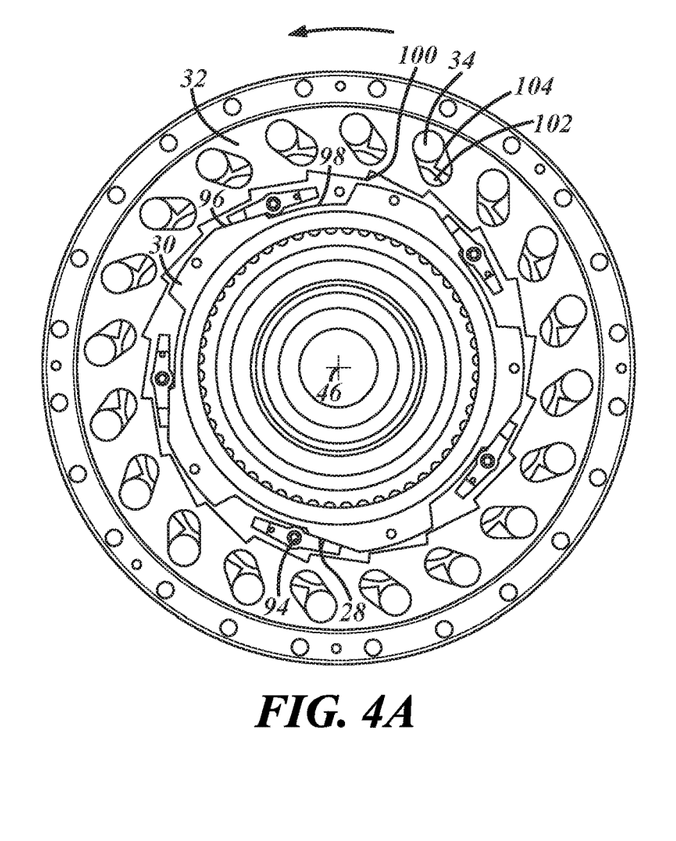
FIGS. 4A-4B are cross-sectional views of the clutch of FIGS. 1-2 taken along lines 4-4 in FIG. 1 showing the clutch disengaged and engaged.
Figure 4B:
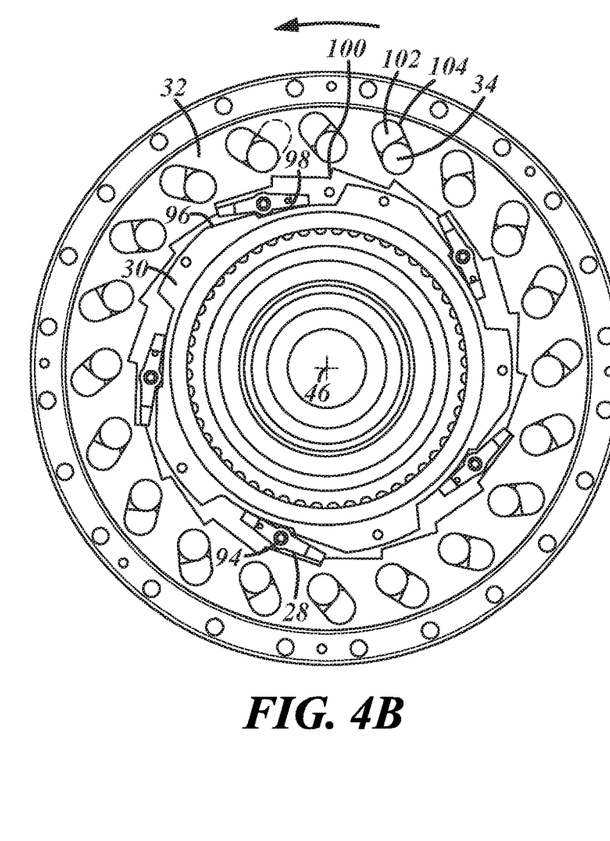

Pawls 28 are provided to cause shift ring 32 to rotate relative to outer races 24, 26 to engage clutch 10 when the rotational speed of the input exceeds the speed of the output. Pawls 28 are disposed axially between inner races 20, 22 and radially between pawl landing ring 30 and shift ring 32. Referring to FIGS. 4A-B, pawls 28 may be equally circumferentially spaced about axis 46. In the illustrated embodiment, clutch 10 includes five pawls 28. It should be understood, however, that the number of pawls 28 may vary. Pawls 28 are supported on one axial side of each race 20, 22 and may be mounted on pins 94 extending between races 20, 22. Pawls 28 are configured for rotation about rotational axes extending through and centered in pins 94 and extending parallel to axis 46. Torsional springs may be disposed about a pin 94 on either side of pawl 28 between pawl 28 and inner races 20, 22. The springs may bias pawls 28 to a predetermined position and prevent rotation of pawls 28 until races 20, 22 reach a predetermined rotational speed sufficient to generate a centrifugal force that will overcome the force of the springs. Once this speed is exceeded, pawls will rotate about their rotational axis in preparation for engagement with shift ring 32. If the rotational speed of the output exceeds the rotational speed of the input, however, pawls 28 will remain disengaged from shift ring 32. When the rotational speed of the input exceeds the rotational speed of the output, pawls 28 engage shift ring 32 as described in greater detail below to cause movement of the shift ring 32 relative to outer races 24, 26.

Pawl landing ring 30 limits rotation of pawls 28 about their rotational axes in either rotational direction. Ring 30 is annular in shape and may be disposed about, and centered about, axis 46. Referring to FIG. 1, ring 30 is disposed axially between inner races 20, 22 and radially outward of hub 14. Ring 30 may define a plurality of splines on a radially inner surface configured to mesh with splines 72 on hub 14. Pawl landing ring 30 may be coupled to inner races 20, 22 through fasteners 84. Referring again to FIGS. 4A-B, ring 30 defines a radially outer surface having a varying diameter and defining a pair of landing surfaces 96, 98 for each end of pawl 28 that limit the rotation of pawl 28 in each rotational direction about its rotational axis.

Shift ring 32 is provided to shift pins 34 into and out of engagement with teeth 86, 88 on inner races 20, 22 and outer races 24, 26, respectively. Shift ring 32 is annular in shape and may be disposed about, and centered about, axis 46. Ring 32 is disposed radially between pawl landing ring 30 (and pawls 28) and outer race 26. Ring 32 may be trapped axially between outer races 24, 26. Referring to FIGS. 4A-B, ring 32 defines a plurality of pawl engagement surfaces 100 on a radially inner perimeter. Each pawl engagement surface 100 extends along a plane that is skewed relative to axis 46 with the radially innermost portion of the surface 100 further forward in the direction of rotation than a radially outermost portion of the surface 100. When the rotational speed of the input exceeds the rotational speed of the output, pawls 28 engage surfaces 100 thereby causing shift ring 32 to rotate (counterclockwise in the illustrated embodiment) relative to outer races 24, 26 for a purpose described below. Shift ring 32 further defines a plurality of apertures 102 extending axially through shift ring 32. Each aperture 102 is configured to receive a corresponding pin 34. In the illustrated embodiment, each aperture 102 is elongated with a border that has a semicircular shape at either longitudinal end and parallel flat edges extending between either longitudinal end. The apertures 102 are skewed relative to axis 46 with the radially innermost portion of the aperture 102 further rearward in the direction of rotation than a radially outermost portion of the aperture 102. The border of each aperture 102 defines a cam surface 104 configured to act on pin 34 together with cam surfaces 92 in outer races 24, 26 during movement of shift ring 32 relative to outer races 24, 26. When the rotational speed of the input is greater than the rotational speed of the output, pawls 28 engage shift ring 32 at pawl engagement surfaces 100 and force shift ring 32 forward relative to outer races 24, 26. Cam surfaces 92, 104 cause pins 34 to move radially inwardly along surfaces 92, 104 such that pins 34 are disposed in a radially inner end of aperture 102 (FIG. 4B) and are moved out of recesses 90 (FIG. 3B) in outer races 24, 26, into engagement with teeth 86, 88 in inner races 20, 22 and outer races 24, 26. When the rotational speed of the output is greater than the rotational speed of the input, outer races 24, 26 are moved forward in the rotational direction relative to shift ring 32 thereby causing pins 34 to move radially outwardly along surfaces 92, 104 and away from teeth 86, 88 in inner races 20, 22 and outer races 24, 26 such that pins 34 are disposed in the radially outer end of aperture 102 (FIG. 4A) and are moved into recesses 90 (FIG. 3A) in outer races 24, 26. The same action disengages shift ring 32 from pawls 28 and the outer races 24, 26 and shift ring 32 overruns inner races 20, 22 along with outer races 24, 26.

Pins 34 are provided to transmit torque between inner races 20, 22, and outer races 24, 26. Pins 34 may be made from conventional metals and metal alloys. Pins 34 may be circular in cross-section and, referring to FIG. 1, may have an axial length equal to the combine axial length of inner races 20, 22 and pawl landing ring 30. The longitudinal ends of each pin 34 are disposed radially between corresponding inner and outer races 20, 24 and 22, 26. The central portion of each pin 34 is disposed within a corresponding aperture 102 in shift ring 32. Pins 34 move radially inwardly and outwardly along cam surfaces 92, 104 in outer races 24, 26 and shift ring 32 depending on the relative rotational movement of shift ring 32 and outer races 24 26, to move pins 34 into and out of engagement with teeth 86, 88 on inner races 20, 22 and outer races 24, 26.

Referring to FIGS. 3A-B and 4A-B, clutch 10 is configured to operate as follows. The input (driving member) and output (driven member) coupled to the clutch 10 through hub 14 and housing 12, respectively, are configured to rotate in the direction illustrated by the curved arrow in FIGS. 3A-B and 4A-B. Whenever the rotational speed of the input in this direction exceeds the rotational speed of the output, pawls 28 engage pawl engagement surfaces 100 in shift ring 32 as shown in FIG. 4B. This action forces shift ring 32 to rotate forward with inner races 20, 22 relative to outer races 24, 26. As shown in FIG. 3B, the relative movement forces pins 34 radially inwardly along cam surfaces 92, 104 in outer races 24, 26, and shift ring 32 and into engagement with teeth 86, 88 in inner races 20, 22 and outer races 24, 26 engaging clutch 10. Outer races 24, 26 (and the output) will then rotate at the same speed as inner races 20, 22 (and the input). If the rotational speed of the output in the illustrated direction exceeds the rotational speed of the input, the shift ring 32 will begin to trail the outer races 24, 26 and, as shown in FIGS. 3A and 4A, pins 34 will be drawn radially outwardly along cam surfaces 92, 104 in outer races 24, 26 and shift ring 32 until recesses 90 in outer races 24, 26 and the radially outer end of apertures 102, in shift ring 32 are aligned and pins 34 are seated within recesses 90 and the radially outer end of aperture 102. Referring to FIG. 4A, shift ring 32 will be drawn forward relative to inner races 20, 22 and pawl engagement surfaces 100 in shift ring 32 will disengage from pawls 28 disengaging clutch 10 and allowing the outer races 24, 26 to overrun the inner races 20, 22.

A clutch 10 in accordance with the present teachings is advantageous relative to conventional clutches because it is capable of synchronizing rotation of the inner and outer races 20, 22, 24, 26 of clutch 10 without displacement of any of the inner and outer races 20, 22, 24, 26 along the rotational axis 46 of clutch 10. As a result, clutch 10 does not have to be configured for movement along axis 46 nor designed to control such movement. Further, clutch 10 requires less space in the direction of axis 46 and is easier to retrofit into preexisting systems (e.g., when a synchronous generator is converted for use as a synchronous condenser.

While the invention has been shown and described with reference to one or more particular embodiments thereof, it will be understood by those of skill in the art that various changes and modifications can be made without departing from the spirit and scope of the invention.

What is claimed is:

1. A clutch, comprising:
   a first inner race configured for rotation about a first rotational axis and defining a first plurality of teeth;
   a first outer race disposed radially outwardly of the first inner race and defining a second plurality of teeth and a first plurality of cam surfaces;
   a second inner race coupled to the first inner race for rotation therewith and configured for rotation about the first rotational axis, the second inner race defining a third plurality of teeth;
   a second outer race disposed radially outwardly of the second inner race and defining a fourth plurality of teeth and a second plurality of cam surfaces;
   a first pawl disposed between the first and second inner races and supported on the first inner race, the first pawl configured for rotation about a second rotational axis parallel to the first rotational axis;
   a shift ring disposed radially outwardly of the first pawl and configured for rotation relative to the first and second outer races, the shift ring defining a plurality of pawl engagement surfaces on a radially inner perimeter and defining a third plurality of cam surfaces; and,
   a plurality of pins, each of the plurality of pins configured for engagement with corresponding ones of the first, second and third pluralities of cam surfaces
   wherein rotation of the first and second inner races in a first direction about the first rotational axis at a rotational speed greater than a rotational speed of the first and second outer races causes the first pawl to engage one of the plurality of pawl engagement surfaces in the shift ring thereby causing relative movement between the shift ring and the first and second outer races and moving the plurality of pins in a radially inward direction along the first, second, and third pluralities of cam surfaces to locate the pins between corresponding teeth from the first and second pluralities of teeth and between corresponding teeth from the third and fourth pluralities of teeth to couple the first and second inner races and the first and second outer races for rotation and rotation of the first and second outer races in the first direction at a rotational speed greater than the rotational speed of the first and second inner races causes relative movement between the shift ring and the first and second outer races thereby moving the plurality of pins in a radially outward direction along the first, second, and third pluralities of cam surfaces and away from the corresponding teeth to uncouple the first and second inner races and the first and second outer races and disengage the shift ring from the first pawl and allow the first and second outer races to overrun the first and second inner races.

2. The clutch of claim 1, further comprising a pawl landing ring disposed between the first and second inner races and coupled to the first and second inner races for rotation therewith, the pawl landing ring configured to restrict a degree of rotation of the first pawl in a first rotational direction about the second rotational axis.

3. The clutch of claim 2 wherein the pawl landing ring is configured to restrict a degree of rotation of the first pawl in a second rotational direction about the second rotational axis opposite the first rotational direction about the second rotational axis.

4. The clutch of claim 1 wherein each of the first and second outer races defines a plurality of recesses, each of the plurality of recesses in the first outer race disposed at an opposite end of one of the first plurality of cam surfaces relative to one of the second plurality of teeth and configured to receive one of the plurality of pins when the first and second outer races overrun the first and second inner races and each of the plurality of recesses in the second outer race disposed at an opposite end of one of the second plurality of cam surfaces relative to one of the fourth plurality of teeth and configured to receive one of the plurality of pins when the first and second outer races overrun the first and second inner races.

5. The clutch of claim 1, further comprising a second pawl disposed between the first and second inner races and supported on the first inner race, the second pawl configured for rotation about a third rotational axis parallel to the first rotational axis, wherein rotation of the first and second inner races in the first direction about the first rotational axis at a rotational speed greater than a rotational speed of the first and second outer races causes the second pawl to engage another one of the plurality of pawl engagement surfaces in the shift ring and rotation of the first and second outer races in the first direction at a rotational speed greater than the rotational speed of the first and second inner races causes the shift ring to disengage from the second pawl.

6. The clutch of claim 1 wherein the first pawl is supported on the second inner race.

7. The clutch of claim 1 wherein the shift ring defines a plurality of apertures, each aperture of the plurality of apertures configured to receive a corresponding pin of the plurality of pins and wherein a border of each aperture is defined by a corresponding one of the third plurality of cam surfaces.

8. The clutch of claim 7 wherein each of the first and second outer races defines a plurality of recesses, each of the plurality of recesses in the first outer race disposed at an opposite end of one of the first plurality of cam surfaces relative to one of the second plurality of teeth and configured to receive one of the plurality of pins when the first and second outer races overruns the first and second inner races, each of the plurality of recesses in the second outer race disposed at an opposite end of one of the second plurality of cam surfaces relative to one of the fourth plurality of teeth and configured to receive one of the plurality of pins when the first and second outer races overrun the first and second inner races, each of the plurality of recesses in the first and second outer races aligned with a radially outer portion of a corresponding aperture of the plurality of apertures when the first and second outer races overrun the first and second inner races.

* * * * *